(12) United States Patent
Suzuki (10) Patent No.: US 7,959,365 B2
(45) Date of Patent: Jun. 14, 2011

(54) BLADE DRIVE DEVICE AND OPTICAL EQUIPMENT

(75) Inventor: Mitsuru Suzuki, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/616,351

(22) Filed: Nov. 11, 2009

(65) Prior Publication Data

US 2010/0054728 A1  Mar. 4, 2010

Related U.S. Application Data

(63) Continuation of application No. PCT/JP2009/052475, filed on Feb. 16, 2009.

(30) Foreign Application Priority Data

Mar. 12, 2008 (JP) .................. 2008-063044

(51) Int. Cl.
*G03B 9/10* (2006.01)
(52) U.S. Cl. ..................... 396/493; 396/486
(58) Field of Classification Search .......... 396/493, 396/486, 489
See application file for complete search history.

(56) References Cited

U.S. PATENT DOCUMENTS

| 5,924,880 | A * | 7/1999 | Watanabe et al. ............ 439/157 |
| 2003/0228145 | A1* | 12/2003 | Ito et al. .................. 396/484 |
| 2005/0238346 | A1* | 10/2005 | Uematsu et al. ............. 396/447 |
| 2009/0295936 | A1* | 12/2009 | Ohkuma .................. 348/222.1 |

FOREIGN PATENT DOCUMENTS

| JP | 9-292644 | 11/1997 |
| JP | 09292644 A | * 11/1997 |
| JP | 2002-287207 | 10/2002 |
| JP | 2005-176414 A1 | 6/2005 |
| JP | 2005-316273 A1 | 11/2005 |
| JP | 2005-341704 A1 | 12/2005 |

OTHER PUBLICATIONS

Machine translation of JP 09-292644.*
International Search Report for International Application No. PCT/JP2009/052475 dated May 11, 2009.
First Notification of Office Action from the Chinese Patent Office dated Nov. 18, 2010 with English translation (4 pages).

* cited by examiner

*Primary Examiner* — W. B. Perkey
*Assistant Examiner* — Linda B Smith
(74) *Attorney, Agent, or Firm* — Kratz, Quintos & Hanson, LLP (57) ABSTRACT

A blade drive device according to a first embodiment includes: a board including an opening and a slide slot; a blade for adjusting an opening amount of the opening; and a transmitting member for transmitting a drive force from an electromagnetic actuator to the blade through the slide slot. The transmitting member includes: an arm member revolving; and an engagement member sliding in contact with an inner surface of the slide slot in conjunction with a revolving of the arm member, and being brought into pressure contact with the inner surface of the slide slot by an external impact.

7 Claims, 11 Drawing Sheets

BLADE DRIVE DEVICE AND OPTICAL EQUIPMENT

CROSS-REFERENCE TO RELATED APPLICATION

This application is a continuation of and claims priority to International Patent Application No. PCT/JP2009/052475 filed on Feb. 16, 2009, which claims priority to Japanese Patent Application No. 2008-063044 filed on Mar. 12, 2008, subject matter of these patent documents is incorporated by reference herein in its entirety.

BACKGROUND OF THE INVENTION

1. Field of the Invention

The present invention relates to blade drive devices and optical equipments.

2. Description of the Related Art

Conventionally, there is known a blade drive device, employed in a camera or the like, including: an actuator serving as a drive source; a transmitting member for transmitting a drive force of the actuator; a blade to which the drive force is transmitted by the transmitting member (see Japanese Unexamined Patent Application Publication No. 2005-341704). Such an actuator includes a rotor, a stator that applies a magnetic force to the rotor, a coil, and a coil bobbin.

Recently, the actuator is also reduced in size in accordance with downsizing of the blade drive device. For this reason, a detent torque of the rotor tends to be reduced. However, when the detent torque is small, the rotor may be rotated to displace the blade from its desired position by an externally applied impact.

SUMMARY OF THE INVENTION

It is therefore an object of the present invention to provide a blade drive device and an optical equipment in which the displacement of a blade due to the externally applied impact is prevented.

According to an aspect of the present invention, there is provided a blade drive device including: a board including an opening and a sliding slot; a blade for adjusting an opening amount of the opening; and a transmitting member for transmitting a drive force from a drive source to the blade through the slide slot, wherein the transmitting member includes: an arm member revolving; and an engagement member sliding in contact with an inner surface of the slide slot in conjunction with a revolving of the arm member, and being brought into pressure contact with the inner surface of the slide slot by an external impact.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A following description will be given of embodiments with reference to the drawings.

First Embodiment

Figure 1:
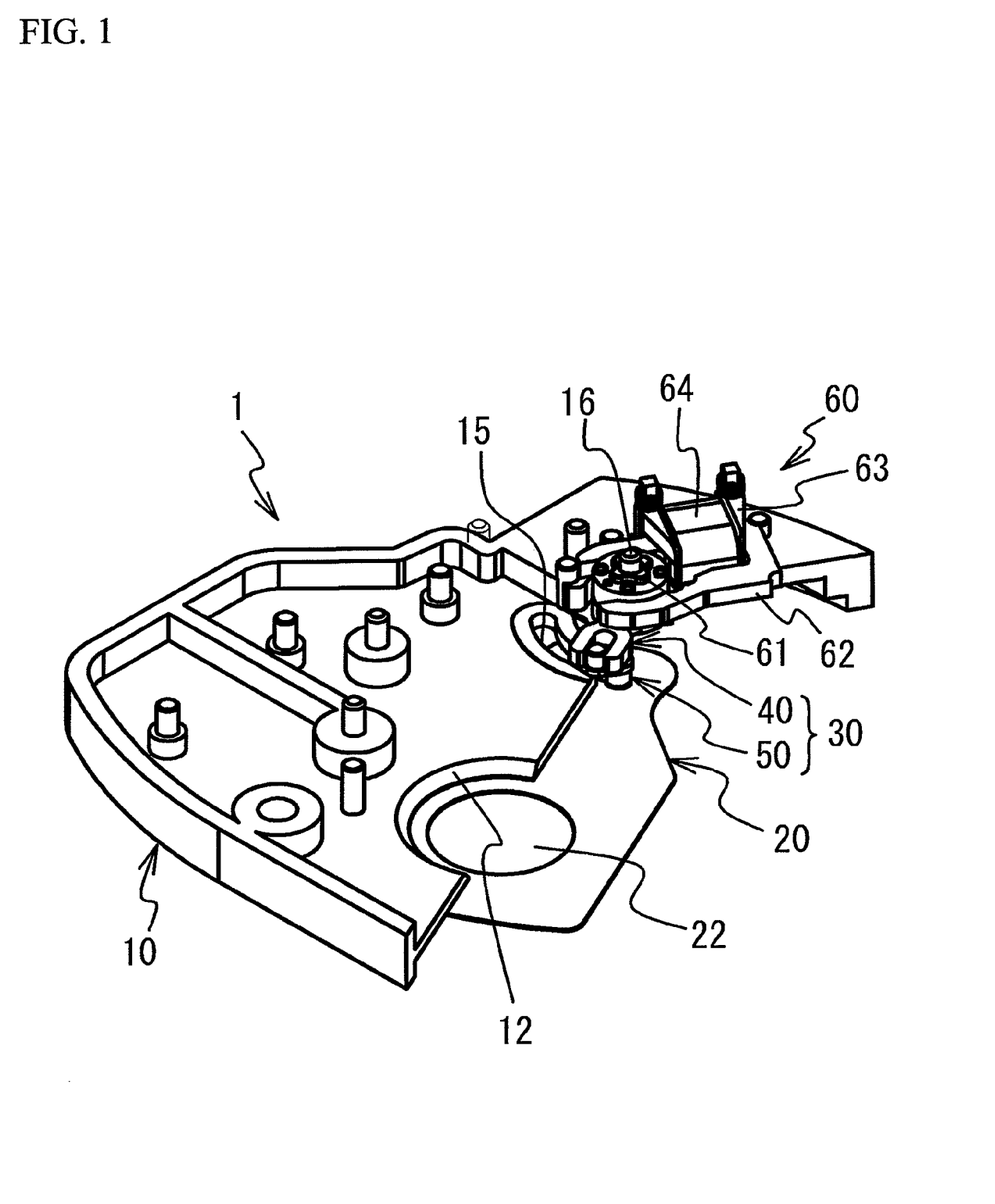
FIG. 1 is a perspective view of a blade drive device according to a first embodiment.
Figure 2:
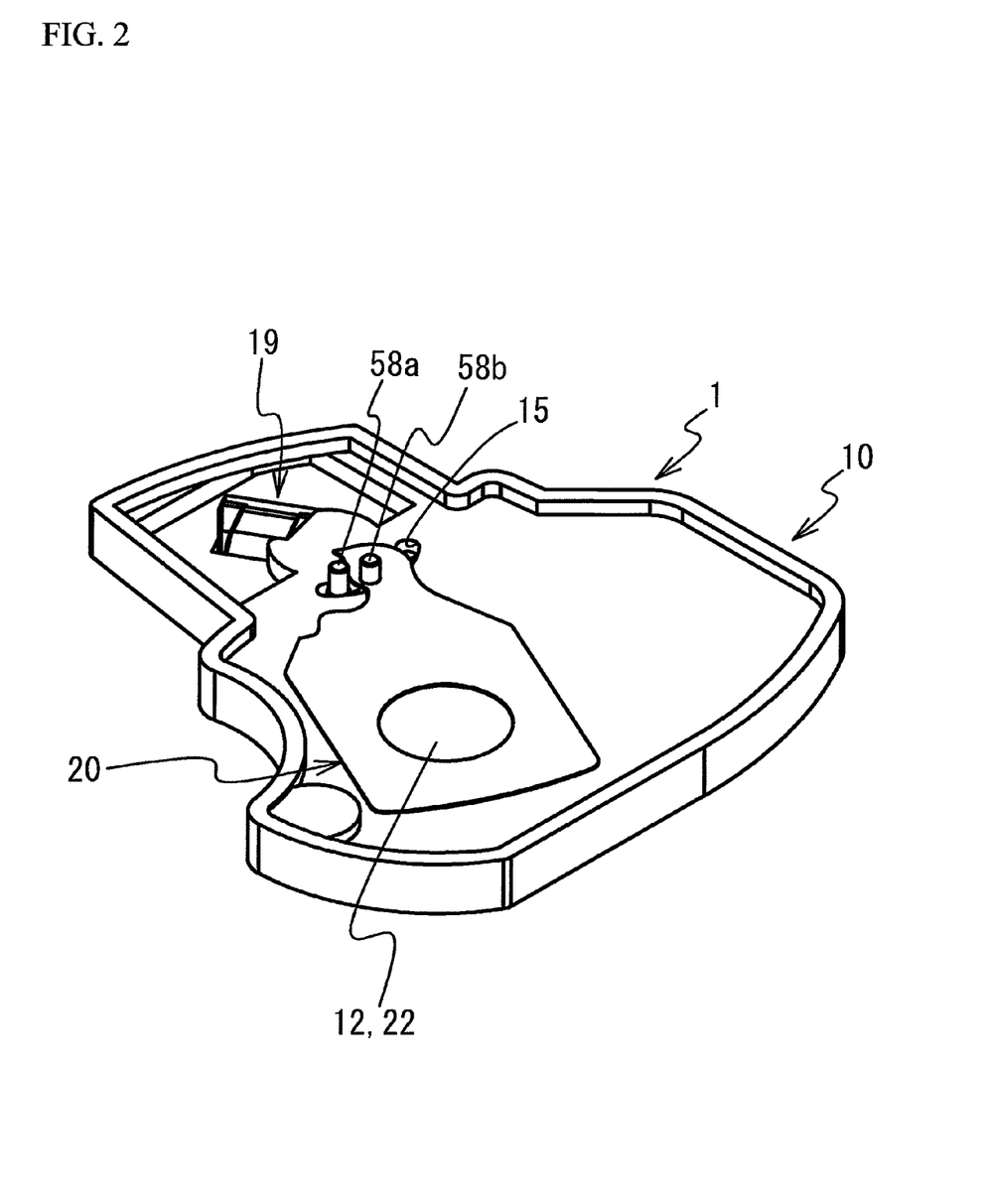
FIG. 2 is a perspective view of the blade drive device according to the first embodiment.

A description will be given of an embodiment according to the present invention with reference to the drawings. FIGS. 1 and 2 are perspective views of a blade drive device 1 according to a first embodiment. The blade drive device 1 according to the first embodiment includes: a board 10 having an opening 12; a blade 20 having an opening 22 for reducing the opening amount of the opening 12; a transmitting member 30; and an electromagnetic actuator 60. Additionally, FIG. 1 is a perspective view of the blade drive device 1 when viewed from the side where the electromagnetic actuator 60 is arranged. FIG. 2 is a perspective view of the blade drive device 1 when viewed from the side where the blade 20 is arranged. Further, FIG. 1 illustrates the board 10 partially cut out. FIG. 2 illustrates the blade 20 partially cut out.

The transmitting member 30 transmits the drive force from the electromagnetic actuator 60 to the blade 20. Specifically, a rotor 61 rotates to revolve the transmitting member 30, thereby swinging the blade 20. Moreover, the transmitting member 30, as will be described later, includes two parts of: an arm member 40; and an engagement member 50. A slide slot 15 with an arc shape is formed in the board 10. The engagement member 50 moves in the slide slot 15, while sliding in contact with an inner surface of the slide slot 15, in conjunction with the revolving of the arm member 40.

The electromagnetic actuator 60 includes: the rotor 61 rotatably supported by a spindle 16 formed on the board 10; a stator 62 generating magnetically attractive and repulsive forces between the stator 62 and the rotor 61; a coil bobbin 63 made of a synthetic resin and attached to an arm portion of the stator 62; a coil 64 wound around the coil bobbin 63 and for energizing the stator 62. Additionally, the board 10 is formed with a relieving hole 19 for relieving the thickness of the electromagnetic actuator 60.

The blade 20 moves between a receded position where the blade 20 recedes from the opening 12 and an overlapped position where the blade 20 overlaps the opening 12, in conjunction with the rotation of the rotor 61. Further, the blade 20 is directly coupled to two connecting pins 58a and 58b, as illustrated in FIG. 2. Specifically, the connecting pins 58a and 58b respectively engage two engagement holes formed in the blade 20. Additionally, FIG. 2 illustrates the blade 20 partially cut out in order to make the other connecting pin 58a visible.

Figure 3:
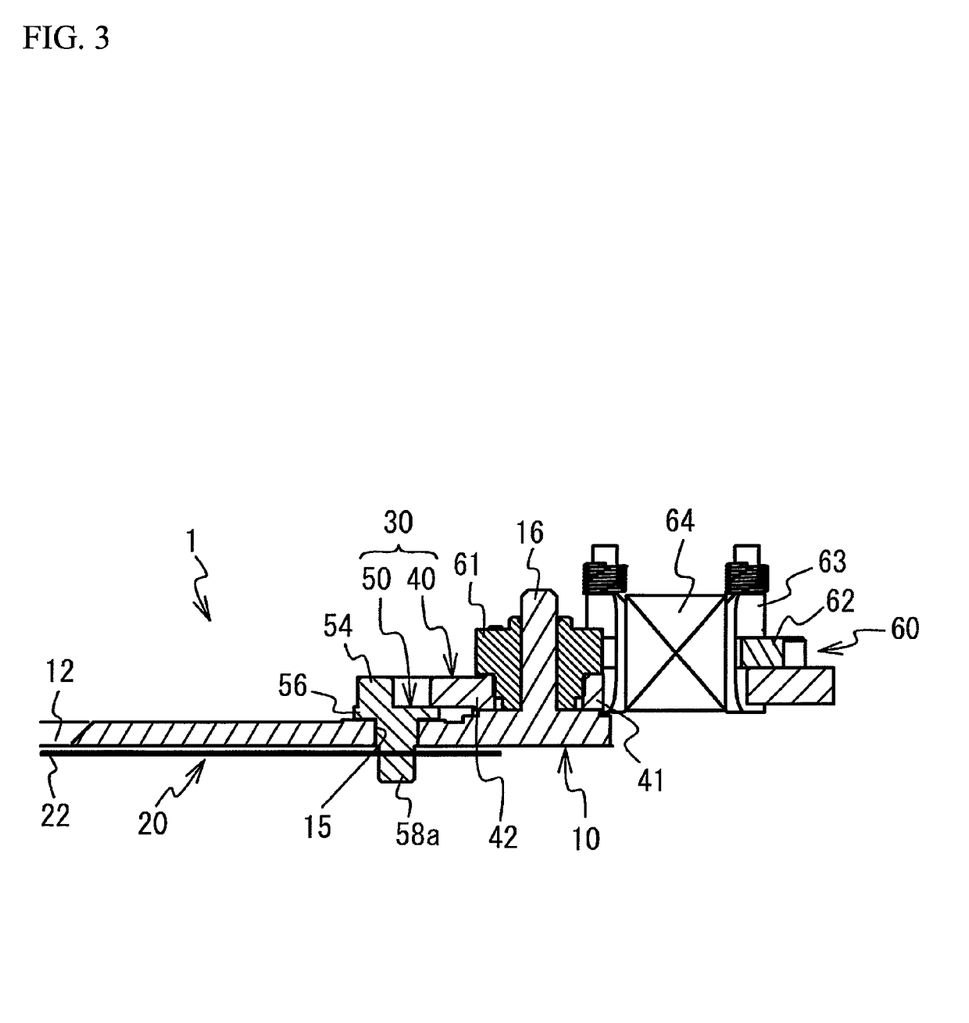
FIG. 3 is a cross-sectional view of the blade drive device according to the first embodiment.
Figure 4:
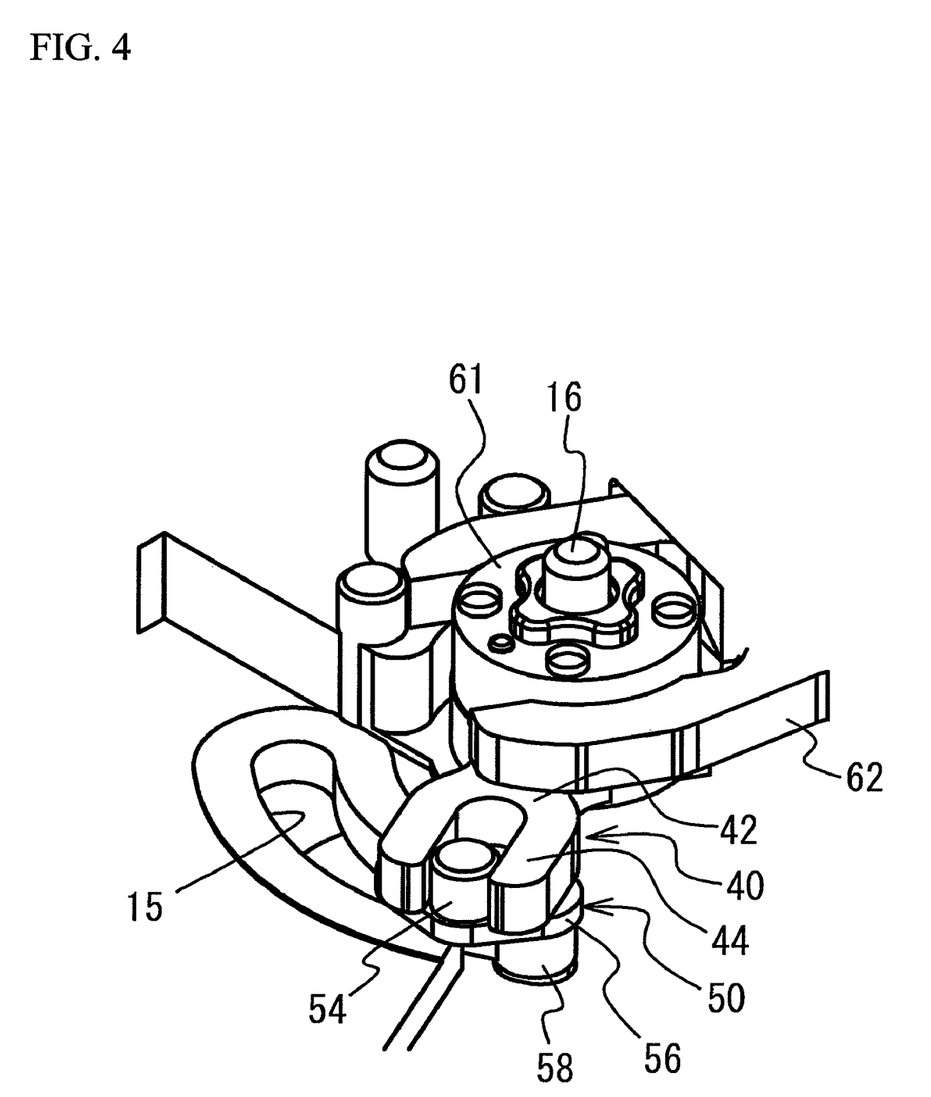
FIG. 4 is an enlarged view of the periphery of a transmitting member as illustrated in FIG. 1.
Figure 5A:
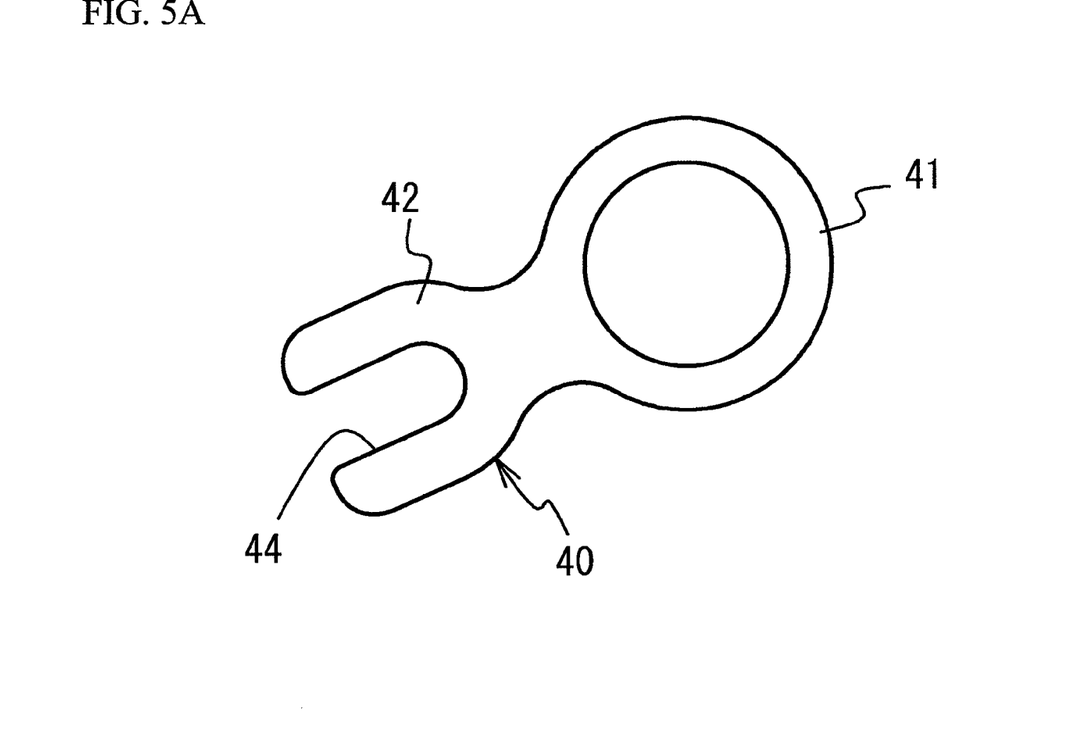
FIGS. 5A and 5B are front views of an arm member and an engagement member.
Figure 5B:
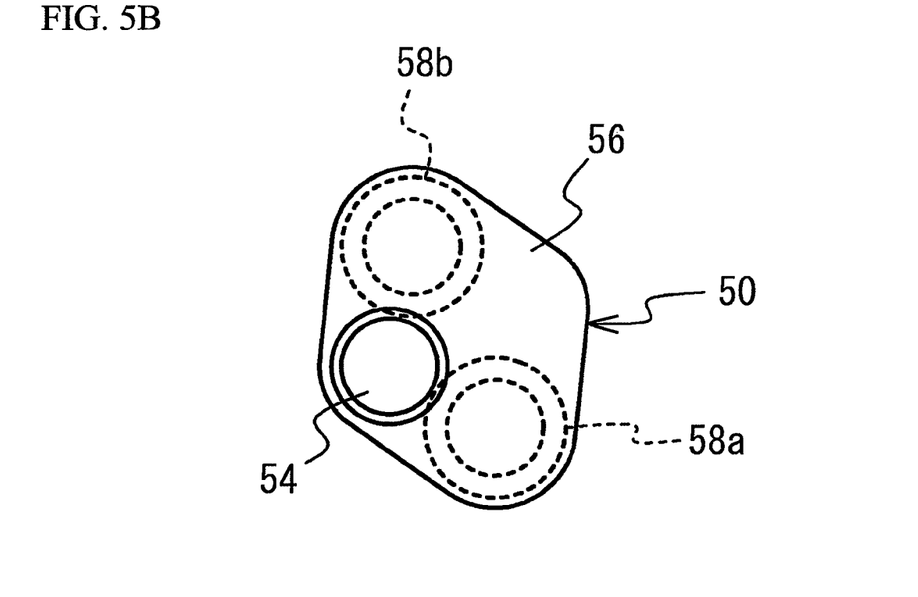

FIG. 3 is a cross-sectional view of the blade drive device 1 according to the first embodiment. FIG. 4 is an enlarged view of the periphery of the transmitting member 30 as illustrated in FIG. 1. FIG. 5A is a front view of the arm member 40. FIG. 5B is a front view of an engagement member 50. As mentioned above, the transmitting member 30 includes the arm member 40 and the engagement member 50 each made of a synthetic resin. The arm member 40 includes: a cylindrical portion 41; an arm portion 42 radially and outwardly extending from the cylindrical portion 41; a sandwiching portion 44 formed at an end portion of the arm portion 42 and having a bifurcated shape. The cylindrical portion 41 fits onto the rotor 61, thereby revolving the arm member 40 with the rotor 61.

The engagement member 50 includes: a base portion 56 having a rhomboidal shape when viewed from its front side; a sandwiched pin (sandwiched portion) 54 formed on one surface of the base portion 56; two connecting pins 58a and 58b formed on the other surface of the base portion 56. The sandwiched pin 54 has a columnar shape. The side surface of the sandwiched pin 54 is sandwiched by the sandwiching portion 44. In this manner, the engagement member 50 is supported by the arm member 40. Additionally, the sandwiched pin 54 has the columnar shape so as to be sandwiched for rotation with respect to the arm member 40. The connecting pins 58a and 58b are aligned in the extending direction of the slide slot 15 at a given interval, and are directly coupled to the blade 20.

Figure 6:
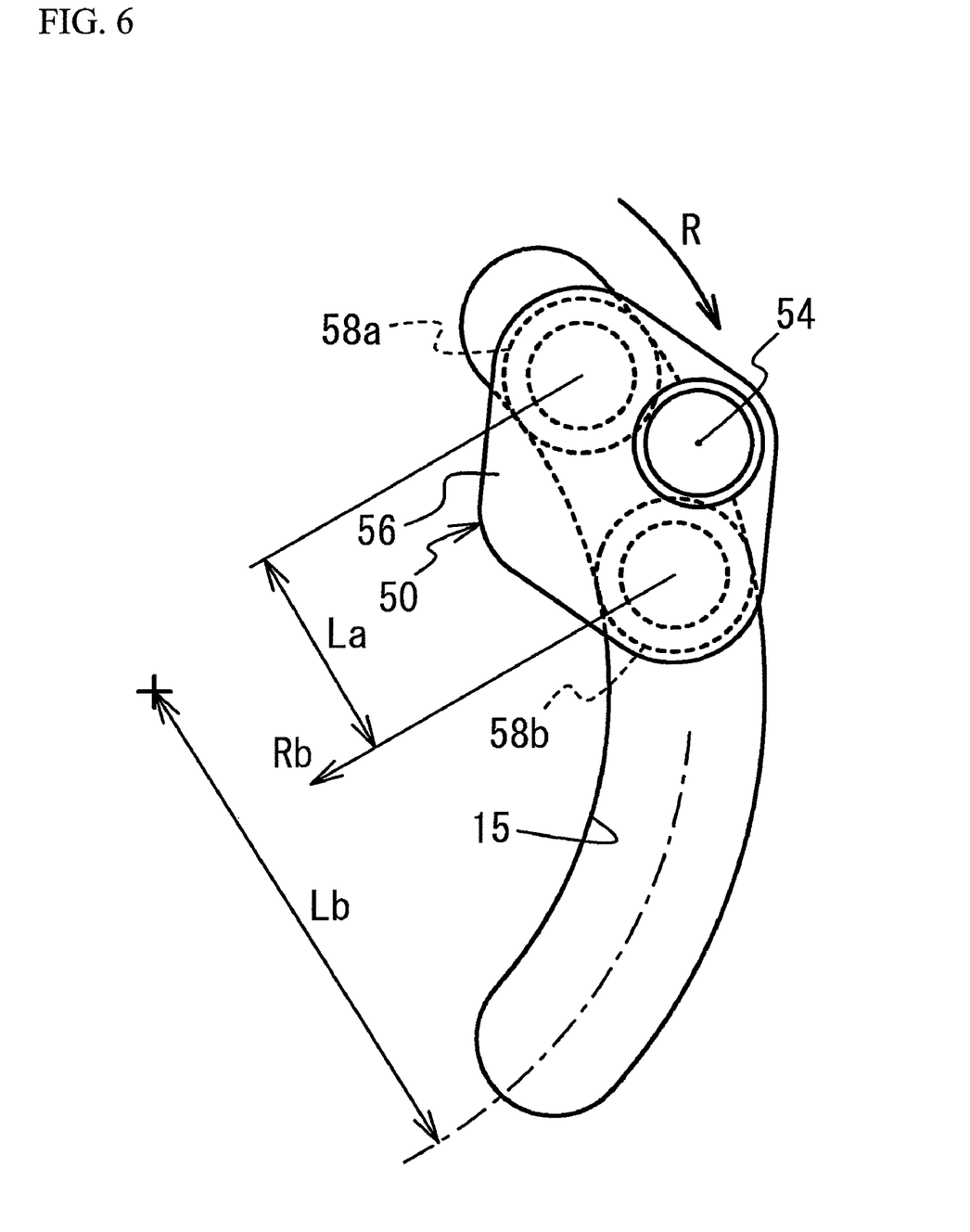
FIG. 6 is an explanatory view of a function of the transmitting member.

Next, a description will be given of a case where an impact is externally applied to the blade drive device 1. Additionally, the term "externally applied impact" means, for example, a case where an optical equipment equipped with the blade drive device 1 is dropped, and dose not include a case where an impact is applied to the blade 20 or the transmitting member 30 by the operation of the electromagnetic actuator 60. FIG. 6 is an explanatory view of a function of the transmitting member 30. Additionally, the arm member 40 is omitted in FIG. 6. For example, it is assumed that the impact is applied to the rotor 61 which stops at the position illustrated in FIG. 6. When the electromagnetic actuator 60 drives, the sandwiching portion 44 causes the engagement member 50 to slide in contact with the inner surface of the slide slot 15 in conjunction with the revolving of the arm member 40. When the above impact is applied to the engagement member 50, the external force exerted to the blade 20 brings the engagement member 50 into pressure contact with the inner surface of the slide slot 15. That is, the connecting pins 58a and 58b come into pressure contact with the inner surface of the slide slot 15. The external force is exerted to rotate the engagement member 50 about the connecting pin 58a or 58b within the slide slot 15. The rotation center of the engagement member 50 may be changed on the basis of the position of the blade 20. FIG. 6 illustrates the case where the external force is exerted to rotate the engagement member 50 about the connecting pin 58a in the clockwise direction R.

When such a force is exerted, the connecting pin 58b tends to move as centering the connecting pin 58a in the direction Rb, illustrated in FIG. 6. However, the connecting pin 58b is in pressure contact with the inner surface of the slide slot 15. Specifically, the connecting pin 58b serves to spread the inner surface, near the rotor 61, of the slide slot 15. In this way, when the engagement member 50 tends to rotate about the connecting pin 58a, the connecting pin 58b exerts a force to the inner surface of the slide slot 15, thereby increasing the sliding resistance of the connecting pin 58b with respect to the slide slot 15. This also applies to a case where an external force is exerted to rotate the engagement member 50 about the connecting pin 58b counterclockwise. The sliding resistance is increased, so that the engagement member 50 remains in its position and is prevented from moving within the slide slot 15, even when an external force is exerted to the engagement member 50. In this manner, the displacement of the blade 20 due to an external force is prevented.

Additionally, when the rotor 61 rotates to move the engagement member 50 within the slide slot 15, the connecting pins 58a and 58b slide in contact with the inner surface of the slide slot 15. Further, the connecting pins 58a and 58b each has the columnar shape, thereby making small the area in contact with the inner surface of the slide slot 15, and making sliding easy.

Further, the rotation center of the blade 20, that is, the rotation center of the rotor 61 may be not always identical to the center of the shape of the slide slot 15. Each of positions of the rotation centers may be different, in light of a space where the electromagnetic actuator 60 is arranged. Furthermore, the relationship between the positions of the rotation center and the center of the shape may be decided in light of the shape of the blade 20 or the impact property thereof. Specifically, in the case where the distance La between the connecting pins 58a and 58b is identical as illustrated in FIG. 6 and where the drive device has the blade with a comparatively large size, that is, in the case where an external impact develops a great external force exerted to rotate the engagement member 50 about the connecting pin 58a or 58b within the slide slot 15, the distance Lb between the center of the shape of the slide slot 15 and the rotation center of the rotor 61 is made longer than a distance in a case where a drive device has a blade with a comparatively small size. This improves its impact resistance.

Second Embodiment

Figure 7:
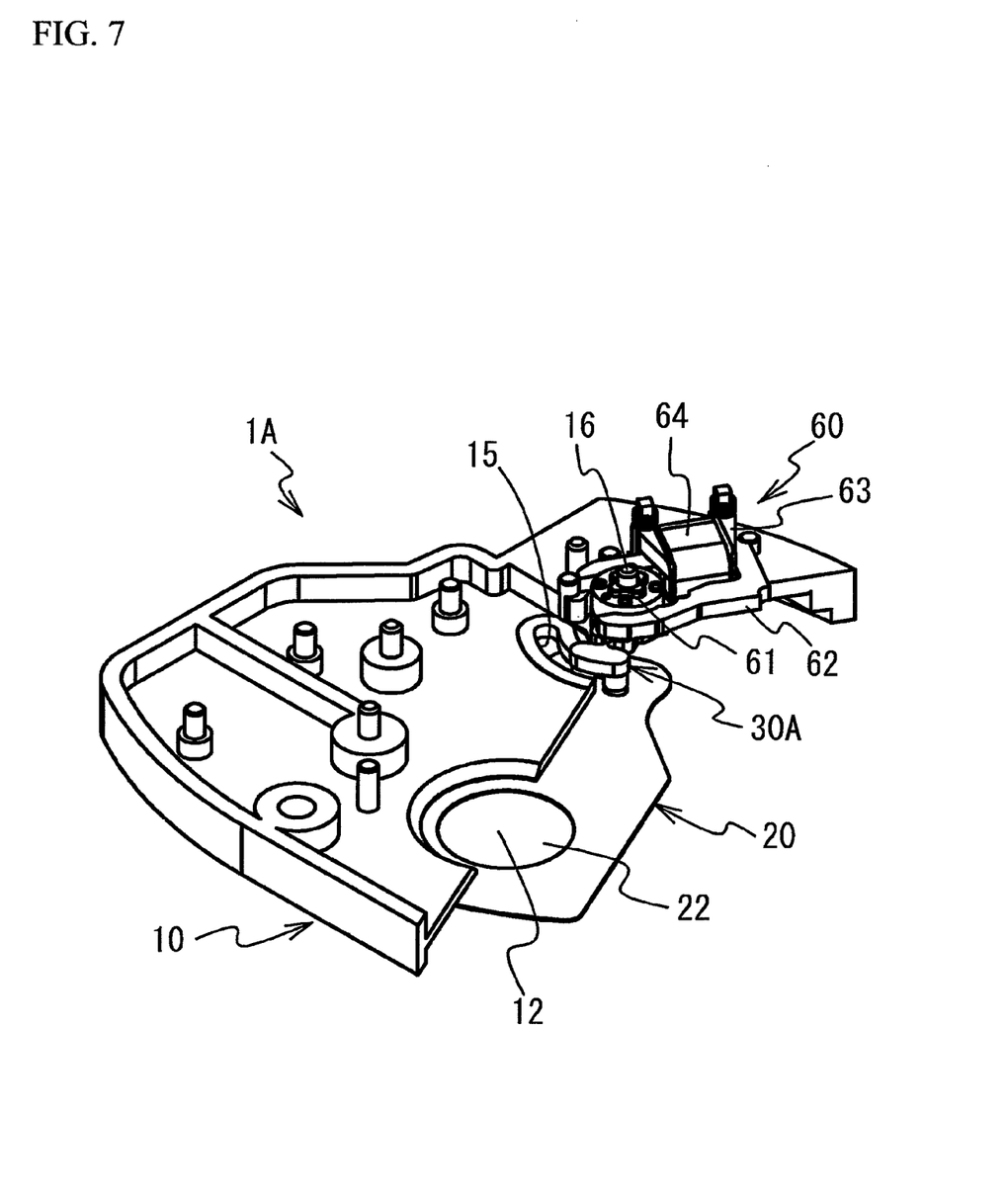
FIG. 7 is a perspective view of a blade drive device according to a second embodiment.
Figure 8:
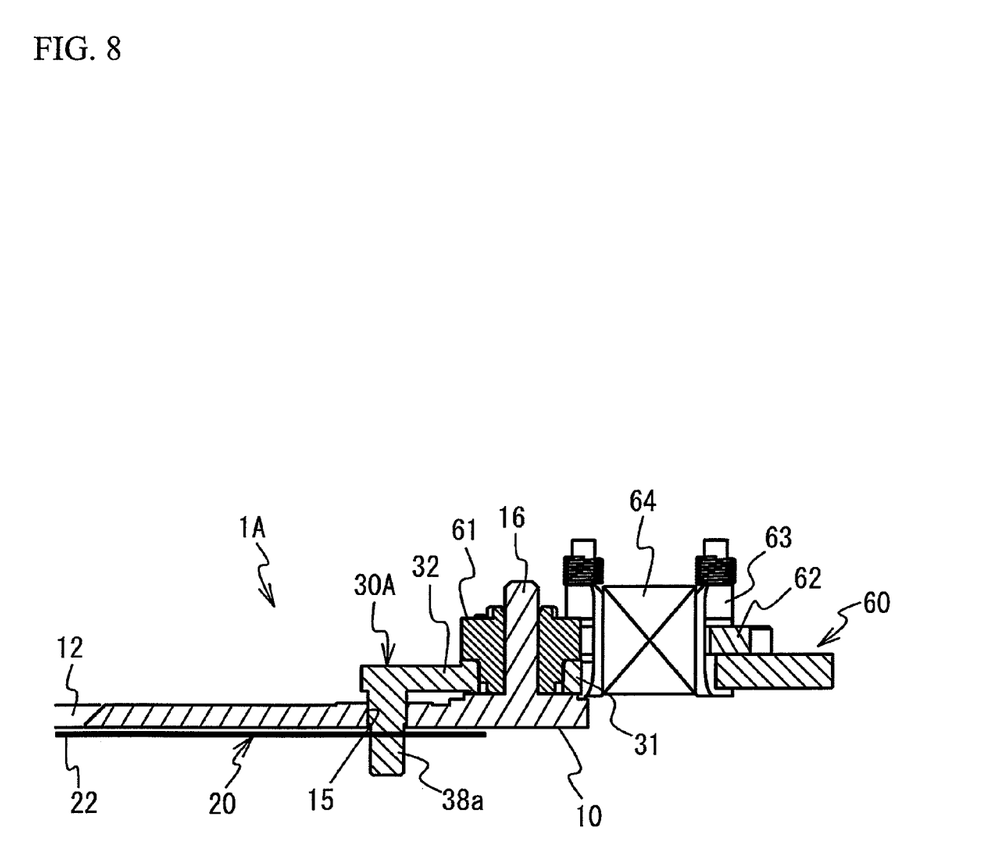
FIG. 8 is a cross-sectional view of the blade drive device according to the second embodiment.
Figure 9:
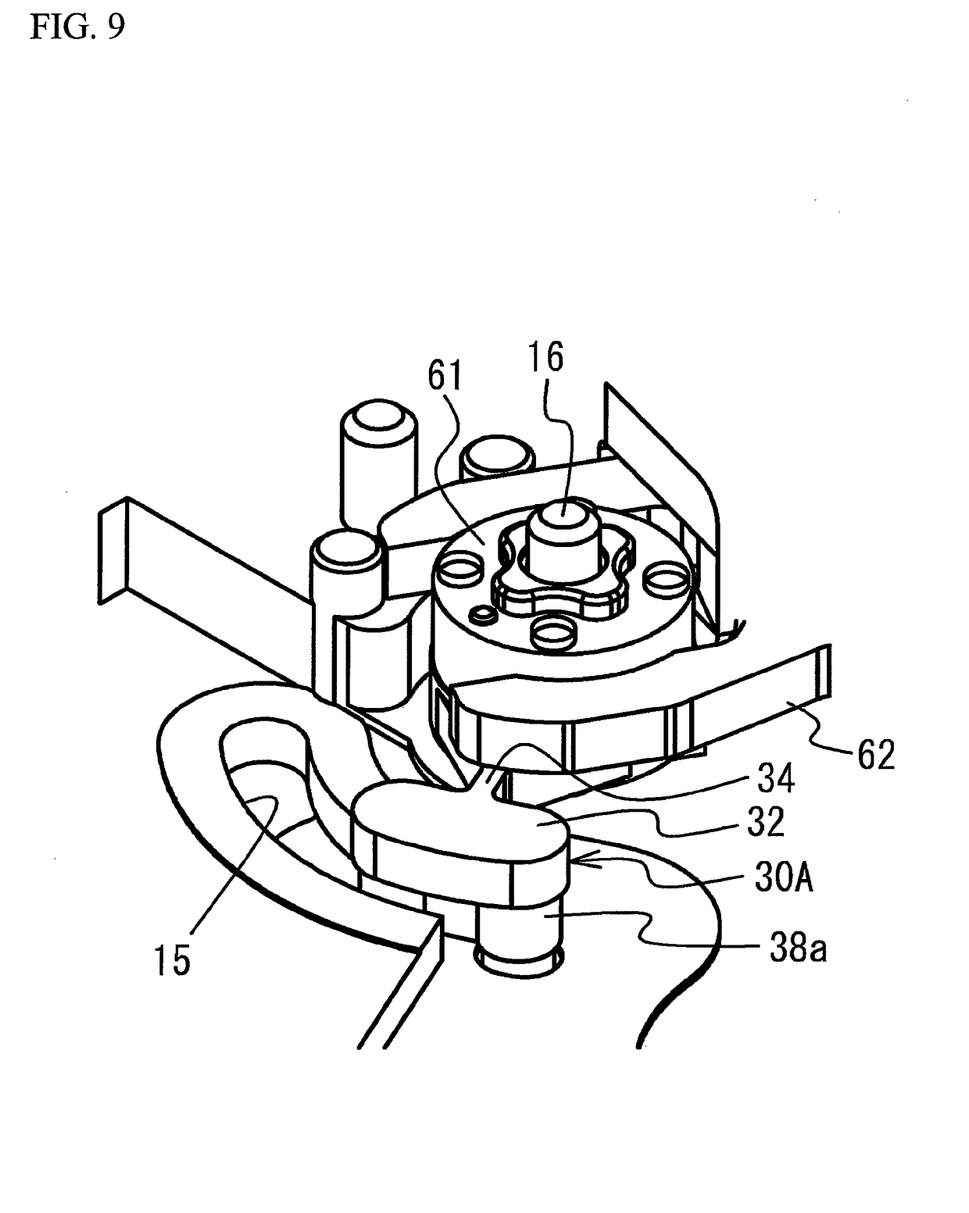
FIG. 9 is an enlarged view of the periphery of a transmitting member of the blade drive device according to the second embodiment.
Figure 10:
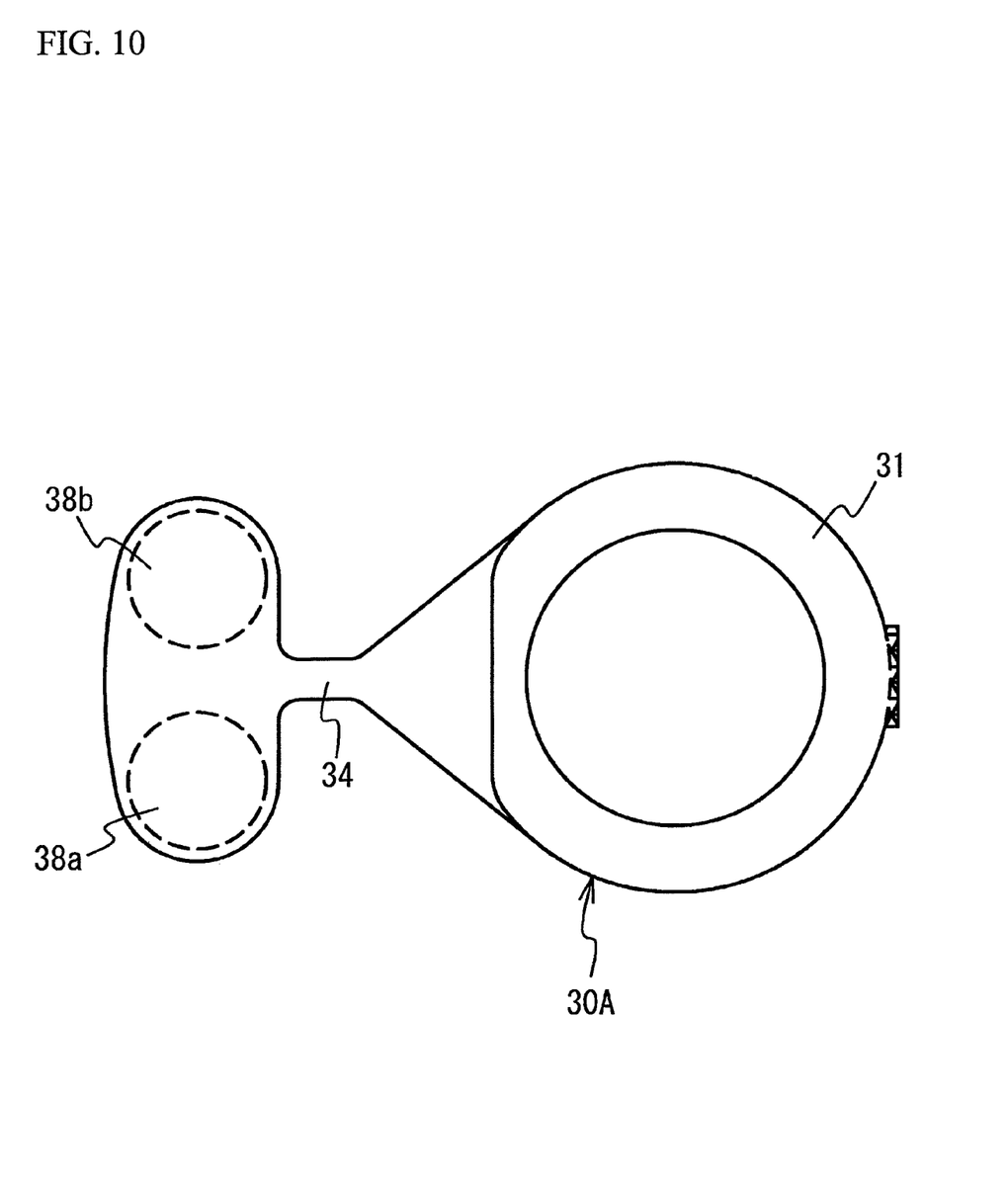
FIG. 10 is a front view of the transmitting member of the blade drive device according to the second embodiment.

Next, a description will be given of a blade drive device 1A according to the second embodiment. Additionally, the like components in the blade drive device 1 according to the first embodiment are designated with the same reference numerals to omit a duplicate description. FIG. 7 is a perspective view of the blade drive device 1A according to the second embodiment. FIG. 8 is a cross-sectional view of the blade drive device 1A according to the second embodiment. FIG. 9 is an enlarged view of the periphery of a transmitting member 30A of the blade drive device 1A according to the second embodiment. FIG. 10 is a front view of the transmitting member 30A of the blade drive device 1A according to the second embodiment.

Unlike the transmitting member 30 of the blade drive device 1 according to the first embodiment, the transmitting member 30A includes an arm member 32, and connecting pins 38a and 38b serving as an engagement member. The arm member 32 and connecting pins 38a and 38b are integrally formed. The transmitting member 30A is made of a synthetic resin. The transmitting member 30A includes: a cylindrical portion 31; the arm member 32 radially and outwardly extending from the cylindrical portion 31; the two connecting pins 38a and 38b formed on an end portion of the arm member 32. The connecting pins 38a and 38b are directly coupled to the blade 20. Specifically, the connecting pins 38a and 38b are engaged in two engagement holes formed in the blade 20. The arm member 32 is provided with a narrow portion 34, which is narrower than any other portions, at its partway. The narrow portion 34 has a function to make the arm member 32 bend about the vicinity of the narrow portion 34 in the revolving direction of the arm member 32.

Figure 11:
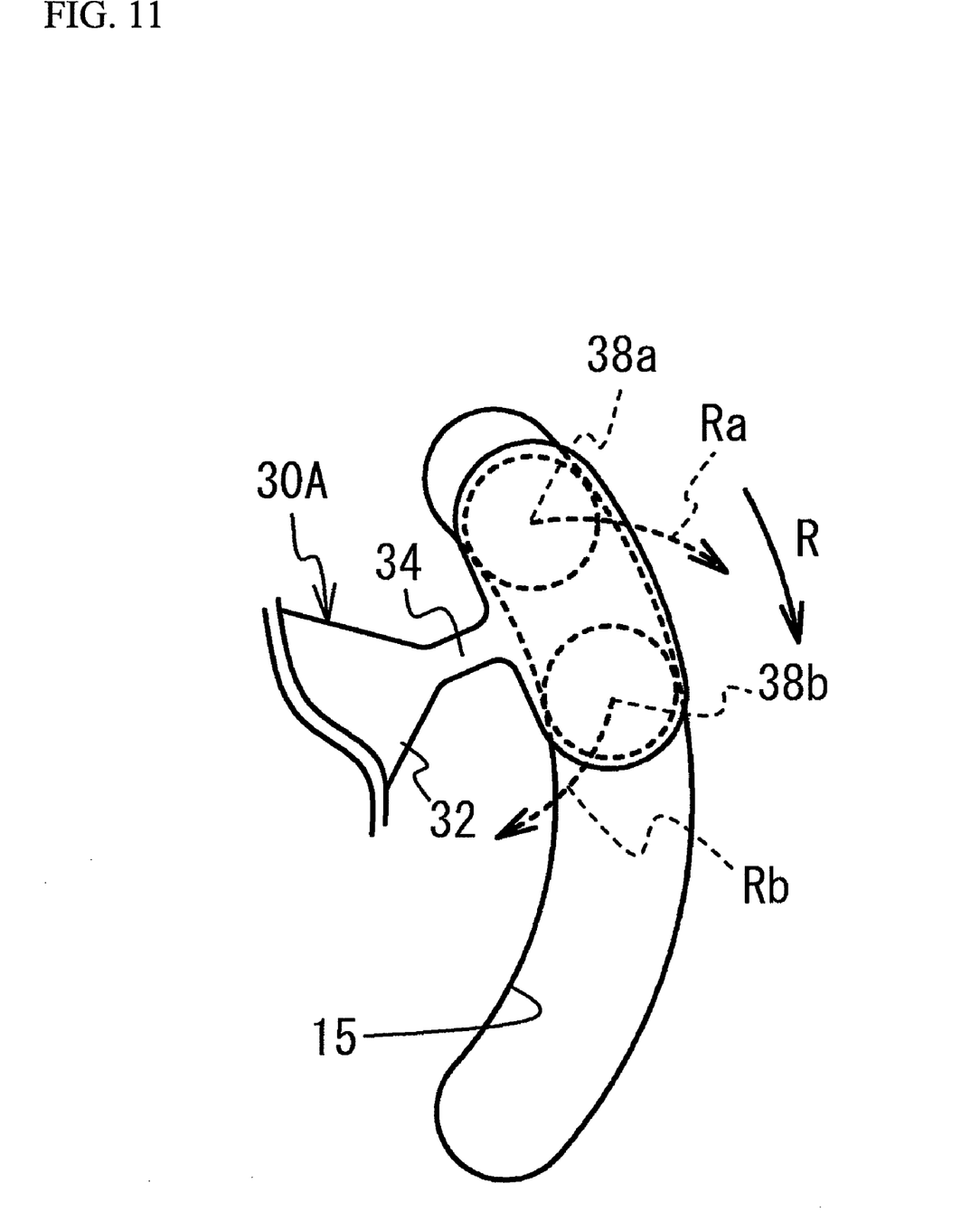
FIG. 11 is an explanatory view of the function of the transmitting member of the blade drive device according to the second embodiment.

Next, a description will be given of a case where an impact is applied to the blade drive device 1A. FIG. 11 is an explanatory view of the function of the transmitting member 30A of the blade drive device 1A according to the second embodiment. In a case where an impact is applied to the blade drive device 1A when the rotor 61 stops at the position illustrated in FIG. 11, the end portion of the arm member 32 is bent due to the narrow portion 34 by this impact. FIG. 11 illustrates a case where the end portion of the arm member 32 tends to be bent by an external force in the clockwise direction R. When such a force is exerted to the arm member 32, the connecting pin 38a is brought into pressure contact with an inner surface, spaced apart from the rotor 61, of the slide slot 15, in the direction Ra illustrated in Figure, and the connecting pin 38b is brought into pressure contact with an inner surface, close to the rotor 61, of the slide slot 15, in the direction Rb illustrated in Figure. In this way, when the end portion of the arm member 32 tends to be bent, the connecting pins 38a and 38b exert the forces to the opposite inner surfaces of the slide slot 15. This increases the sliding resistance of the connecting pins 38a and 38b against the slide slot 15. Accordingly, the blade 20 as well as the transmitting member 30A is prevented from being displaced.

While the exemplary embodiments of the present invention have been illustrated in detail, the present invention is not limited to the above-mentioned embodiments, and other embodiments, variations and modifications may be made without departing from the scope of the present invention.

The embodiments have exemplified the blade 20 which has the opening 22 for reducing the opening amount of the opening 12. However, a blade for fully closing the opening 12 may be employed. Additionally, a filter with transparency may be provided on the opening 22 of the blade 20.

The embodiments have exemplified two pins which are directly coupled to the blade 20. However, the engagement member may have any shape at a part directly coupled to the blade 20, as long as the engagement member and the blade 20 integrally rotate in conjunction with the revolving of the arm member 40 to slide in contact with the inner surface of the slide slot 15.

Finally, several aspects of the present invention are summarized as follows.

According to an aspect of the present invention, there is provided a blade drive device including: a board including an opening and a slide slot; a blade for adjusting an opening amount of the opening; and a transmitting member for transmitting a drive force from a drive source to the blade through the slide slot, wherein the transmitting member includes: an arm member revolving; and an engagement member sliding in contact with an inner surface of the slide slot in conjunction with a revolving of the arm member, and being brought into pressure contact with the inner surface of the slide slot by an external impact.

When an impact is externally applied, the engagement member of the transmitting member is brought into pressure contact with the inner surface of the slide slot. This develops the sliding resistance, thereby suppressing the displacement of the transmitting member from its desired position. Accordingly, the displacement of the blade due to the externally applied impact is suppressed.

In the above configuration, the engagement member may be separately provided from the arm member, and may slide in contact with the inner surface of the slide slot in conjunction with the revolving of the arm member. Since the engagement member is separately provided from the arm member and slides in contact with the inner surface of the slide slot, the engagement member is brought into pressure contact with the inner surface of the slide slot with certainty by the externally applied impact. This suppresses the displacement of the blade.

In the above configuration, the arm member may include a sandwiching portion for sandwiching the engagement member, and having an end with a bifurcated shape, and the engagement member may include a sandwiched portion for being sandwiched by the sandwiching portion, and having a projection shape. With such a configuration, the engagement member securely slides in contact with the inner surface of the slide slot with certainty.

In the above configuration, the arm member may bend to bring the engagement member into pressure contact with the inner surface of the slide slot. With such a configuration, the arm member is bent and brought into pressure contact with the inner surface of the slide slot by an externally applied impact. This suppresses the displacement of the blade with certainty.

In the above configuration, the arm member may include a narrow portion for making the arm member bend in a revolving direction of the arm member.

In the above configuration, the blade may be directly coupled to the engagement member.

In the above configuration, the engagement member may include a plurality of pins sliding in contact with the inner surface of the slide slot.

According to another aspect of the present invention, there is provided an optical equipment including the blade drive device.

What is claimed is:

1. A blade drive device comprising:
    a board including an opening and a slide slot;
    a blade for adjusting an opening amount of the opening; and
    a transmitting member for transmitting a drive force from a drive source to the blade through the sliding slot,
    wherein the transmitting member includes:
    an arm member revolving; and
    an engagement member including a plurality of pins sliding in contact with an inner surface of the slide slot in conjunction with a revolving of the arm member, and being brought into pressure contact with the inner surface of the slide slot by an external impact.

2. The blade drive device of claim 1, wherein the engagement member is separately provided from the arm member, and slides in contact with the inner surface of the slide slot in conjunction with the revolving of the arm member.

3. The blade drive device of claim 2, wherein:
    the arm member includes a sandwiching portion for sandwiching the engagement member, and having an end with a bifurcated shape; and
    the engagement member includes a sandwiched portion for being sandwiched by the sandwiching portion, and having a projection shape.

4. The blade drive device of claim 1, wherein the arm member bends to bring the engagement member into pressure contact with the inner surface of the slide slot.

5. The blade drive device of claim 4, wherein the arm member includes a narrow portion for making the arm member bend in a revolving direction of the arm member.

6. The blade drive device of claim 1, wherein the blade is directly coupled to the engagement member.

7. An optical equipment comprising a blade drive device comprising:
    a board including an opening and a slide slot;
    a blade for adjusting an opening amount of the opening; and
    a transmitting member for transmitting a drive force from a drive source to the blade through the sliding slot,
    wherein the transmitting member includes:
    an arm member revolving; and
    an engagement member including a plurality of pins sliding in contact with an inner surface of the slide slot in conjunction with a revolving of the arm member, and being brought into pressure contact with the inner surface of the slide slot by an external impact.

* * * * *